United States Patent [19]

Merkle

[11] Patent Number: 4,981,041

[45] Date of Patent: Jan. 1, 1991

[54] MEASURING AND DISPENSING DEVICE

[76] Inventor: John H. Merkle, 7105 Duluth St., Golden Valley, Minn. 55427

[21] Appl. No.: 895,809

[22] Filed: Aug. 12, 1986

[51] Int. Cl.$^5$ .............................................. G01F 19/00
[52] U.S. Cl. ................................. 73/426; 401/171; 401/176; 401/266; 425/118; 425/286
[58] Field of Search ................ 401/176, 12, 171, 82, 401/266; 30/124, 128, 130; 73/426, 429; 425/118, 276, 281, 282, 283, 286

[56] References Cited

U.S. PATENT DOCUMENTS

| | | | |
|---|---|---|---|
| 353,115 | 11/1866 | Beardsley et al. | 73/429 |
| 553,820 | 2/1896 | Ackerman | 73/429 |
| 849,074 | 4/1907 | Labry | 73/429 |
| 925,275 | 6/1909 | Benjamin | 425/286 |
| 993,508 | 5/1911 | Colmery | 425/283 |
| 1,532,275 | 4/1925 | Strumpf | 425/118 |
| 1,586,371 | 5/1926 | Lape | 401/173 |
| 1,593,335 | 7/1926 | Haugen | 425/286 |
| 1,595,635 | 8/1926 | Vollans | 425/286 |
| 1,661,734 | 3/1928 | Pearce . | |
| 1,706,582 | 3/1929 | Merrill . | |
| 1,908,813 | 5/1933 | Blaho . | |
| 2,052,510 | 8/1936 | Woolverton | 425/118 |
| 2,085,446 | 6/1937 | Philippe | 401/176 X |
| 2,173,253 | 9/1939 | Gallo | 425/286 |
| 2,204,730 | 6/1940 | Eskilson . | |
| 2,249,401 | 7/1941 | Sieg | 401/176 |
| 2,256,865 | 9/1941 | Gilbert . | |
| 2,324,477 | 7/1943 | Berns | 425/281 |
| 2,329,437 | 9/1943 | Corwin . | |
| 2,458,120 | 1/1949 | Volpini | 401/176 X |
| 2,581,745 | 1/1952 | Amorino et al. | 401/12 |
| 2,583,808 | 1/1952 | Bernhardt . | |
| 2,603,867 | 7/1952 | Van Guilder . | |
| 2,755,503 | 7/1956 | Whetstone | 401/176 |
| 2,756,498 | 7/1956 | Wasser | 401/12 X |
| 3,049,926 | 8/1962 | Victor . | |
| 3,162,884 | 12/1964 | Bordwine et al. | 401/12 |
| 3,669,063 | 6/1972 | Daniluke | 401/12 X |
| 3,920,156 | 11/1975 | Hicks | 401/82 X |
| 4,073,192 | 2/1978 | Townsend | 73/429 |
| 4,335,609 | 6/1982 | Saulsbury . | |

FOREIGN PATENT DOCUMENTS

| | | | |
|---|---|---|---|
| 892804 | 1/1944 | France | 401/176 |
| 553568 | 12/1956 | Italy | 401/176 |
| 345469 | 5/1960 | Switzerland | 73/429 |

Primary Examiner—Steven A. Bratlie
Attorney, Agent, or Firm—Gregory P. Kaihoi

[57] ABSTRACT

A measuring and dispensing device for shortening and similar semi-solid materials. The device includes a scoop having a tubular body with an inner surface, the scoop being open at both ends and having a handle. A plunger is closely receivable in one end of the tubular body and is movable to displace semi-solid material from the other end of the tubular body. Measurement gradations are provided on either the tubular body or the plunger, the tubular body preferably being transparent. The scoop may be filled with shortening, the excess being cut off with a knife or similar object, and the plunger then inserted to simultaneously measure and displace the desired amount of semi-solid material. To spread semi-solid material on a surface such as a cookie sheet or casserole, a flexible perforated cap is provided which is removably attachable to the opposite end of the tubular body. As the plunger is depressed and the device is drawn across the surface, the perforations allow semi-solid material to extrude outwardly thereby dispersing the material on the surface as desired.

6 Claims, 1 Drawing Sheet

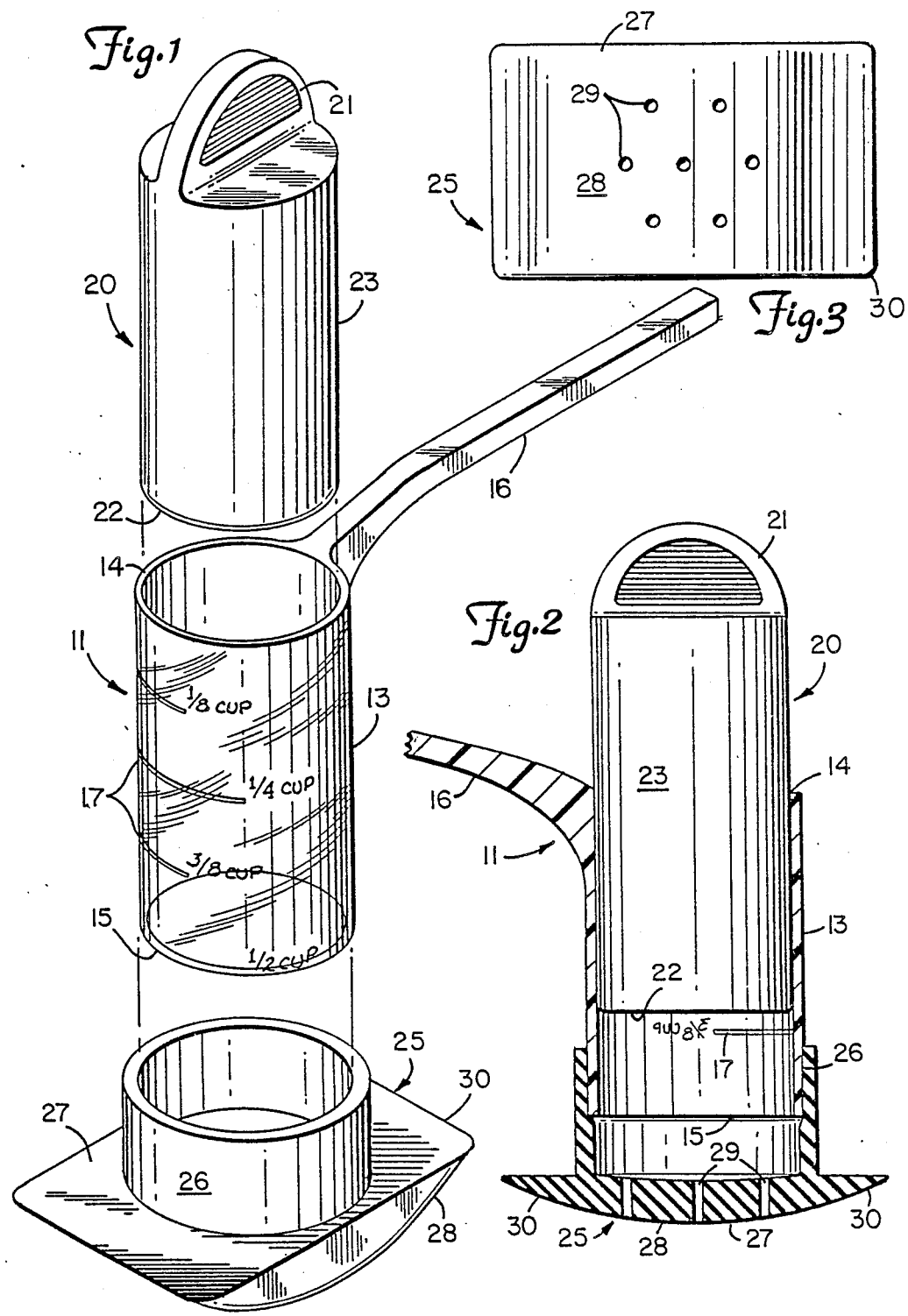

MEASURING AND DISPENSING DEVICE

TECHNICAL FIELD

The invention relates to measuring and dispensing devices, and more particularly to such devices useful in the measuring and dispensing of semi-solid materials such as shortening.

BACKGROUND ART

The measuring and dispensing of such semi-solid materials such as shortening, margarine, butter, etc. is typically a messy and awkward task. A variety of prior art devices have been proposed for use in measuring such materials. Such devices generally are characterized by being relatively complicated in structure and operation, however and therefore have not gained wide acceptance. By way of example, are the following: U.S. Pat. Nos. 2,329,437, 2,256,865, 2,583,808, and 2,204,730. Furthermore, many of the prior art devices do not provide convenient means for extracting the substance which has been measured, or for controllably dispensing it, e.g., spreading shortening on a pan.

DISCLOSURE OF INVENTION

The invention provides a measuring and dispensing device for shortening and similar semi-solid materials which comprises a scoop having a tubular body with an inner surface, the scoop being open at both ends and having a handle attached thereto. The device further includes a plunger closely receivable in one end of the tubular body and being movable to displace semi-solid material from the other end of the tubular body. Preferably the tubular body is of substantially constant cross section throughout its length. In a preferred embodiment, the plunger is receivable in either end of the tubular body and includes a generally planar face for displacing the semi-solid material. The plunger also includes means for abutting the inner surface of the tubular body to maintain the face thereof generally perpendicular to the longitudinal axis of the tubular body as the face is moved within the tubular body.

Desirably the end of the plunger opposite the face includes tab means for allowing the plunger to be digitally manipulated. For ease of use, desirably the length of the tubular body does not substantially exceed the length of the plunger. The tubular body may be transparent allowing visual determination of the position of the face of the plunger within the tubular body, and measurement gradations may be marked on one of the plunger and the tubular body.

In a preferred embodiment, the device further includes a perforated cap removably attachable to an end of the tubular body, the perforations allowing the semi-solid material to extrude outwardly when under pressure from the plunger. The cap may include a flexible convex outer surface to facilitate deposition of the semi-solid material on either flat or concave surfaces.

The invention also relates to a method of measuring shortening and similar semi-solid materials, comprising the steps of providing a measuring device including a scoop having a tubular body which is open on both ends and a handle thereon; drawing the scoop into the semi-solid material to substantially fill the tubular body; withdrawing the scoop from the semi-solid material and cutting off excess semi-solid material protruding outwardly from both ends of the tubular body. The method may also include the steps of providing a plunger closely receivable in one end of the tubular body, and inserting the plunger into the tubular body to a desired depth to displace a measured portion of the semi-solid material, which portion may then be cut off from the remaining material.

The invention further relates to a method of dispensing semi-solid material across a surface, said method comprising the steps of providing a scoop having a tubular body open on both ends and a handle; drawing the scoop into the semi-solid material to at least partially fill the tubular portion therewith; placing a perforated cap over one end of the tubular body; inserting a plunger, which is closely and movably receivable within the tubular body, into the other end of the tubular body; and pressing the plunger against the semi-solid material to urge it out through the perforations in the cap while simultaneously moving the cap across a surface to disperse the semi-solid material thereon.

BRIEF DESCRIPTION OF THE DRAWINGS

FIG. 1 is an exploded, perspective view of a device of the invention;

FIG. 2 is an assembled, cross-sectional view of the device of FIG. 1; and

FIG. 3 is a bottom view of a device of the invention.

BEST MODE FOR CARRYING OUT THE INVENTION

In FIG. 1, a preferred device of the invention includes a scoop (11) having a tubular body (13) with first and second open ends (14) and (15) respectively. The scoop (11) further includes a handle (16). The tubular body (13) is depicted as being generally cylindrical in shape. Other tubular configurations might also be used, including square, rectangular, oval, or any other suitable shape. Desirably the tubular body (13) is made of a transparent material to allow visual determination of the position of the plunger (20) within the tubular body (13).

For use of the device as a measuring utensil, either the plunger (20) or the tubular body (13) may include measuring gradations (17) thereon. As shown in FIG. 1, preferably the gradations (17) are on the tubular body (13). Such gradations (17) may be printed or painted on either the outside surface or the inside surface of the tubular body (13), or may be molded internally with the tubular body. If molded into the tubular body (13), the gradations (17) may either extend from or be engraved into the tubular body (13); desirably gradations formed on the interior of the tubular body (13) should not extend inwardly of the inner surface of the tubular body (13), as this would interfere with operation of the plunger (20) within the tubular body (13).

The gradations (17) may commence at either end of the tubular body (13). In FIG. 1 the gradations (17) commence at the first end (14), thereby corresponding to the amount of semi-solid material which has been displaced from the tubular body (13). If the gradations (17) begin at the second end (15) of the tubular body (13), they then correspond to the amount of semi-solid material remaining in the tubular body (13).

In FIGS. 1 and 2 the plunger (20) is depicted as including a cylindrical portion (23) having a generally planar face (22) at one end and a finger tab (21) at the other end. The face (22) should extend substantially across the opening defined by the tubular body (13) and be closely receivable within the tubular body (13). The cylindrical portion (23) of the plunger (20), however, need not be of continuous cross-section, and, indeed, need not be an actual cylinder. This portion of the plunger (20), however, must include some means for abutting the inner surface of the tubular body (13) to maintain the face (22) generally perpendicular to the longitudinal axis of the tubular body (13) as the face (22) is moved within the tubular body (13). A variety of configurations might suffice to perform this function, including, for example, a web extending longitudinally from the face (22) to the finger tab (21), and extending radially in a plurality of directions from the axis of the tubular body (13) to engage the inner surface of the tubular body (13).

At the end opposite the face (22), finger tab means (21) is provided to facilitate digital manipulation of the plunger (20). Any suitable tab (21) or equivalent structure which allows one to hold onto, insert, and remove the plunger (20) from the tubular body (13) will suffice.

FIGS. 1 3 show three separate views of the perforated cap (25). The cap (25) includes a tubular collar (26) for closely receiving the tubular body (13) of the scoop (11). Desirably the tubular body (13) of the scoop (11) is received snugly within the tubular collar (26) of the cap (25), rather than vice versa, to avoid interference with the function of the plunger (20). FIG. 2 depicts the tubular body (13) of the scoop (11) as extending only partially into the tubular collar (26) of the cap (25). During use, preferably the tubular body (13) extends into the tubular collar (26) so as to abut the inner surface of the body (27) of the cap (25).

The body (27) of the cap (25) extends over and occludes the end of the tubular body (13). At least one and preferably a plurality of perforations (29) extend through the body (27) of the cap (25) to allow semi-solid material to extrude therethrough. Preferably the perforations (29) extend generally parallel to the axis of the tubular body (13) and the tubular collar (26).

The body (27) of the cap (25) includes a face (28) for engagement with a surface on which semi-solid material is to be spread. The face (28) may be generally planar, or may be convex, as shown in FIGS. 1 and 2. A convex face (28) is particularly useful in dispersing semi-solid material on concave surfaces. A preferred cap (25) depicted in FIG. 1 has a face (28) that is frusto-cylindrical in shape; the face (28) might also be frusto-spherical. Desirably the body (27) of the cap (25) is flexible and/or compressible to facilitate adaptation of the device for use on a variety of surface configurations, including, e.g., both flat cookie sheets and concave casseroles, as well as most other uneven surfaces.

The cap (25) may includes a flange portion (30) which extends radially outwardly beyond the tubular collar (26) to facilitate dispersal of the semi-solid material. The flange portion (30), however, is optional, and may be omitted in certain applications. If included, the flange, as shown in plan view in FIG. 3, may be rectangular in shape, square, round, or any other suitable configuration. A square or rectangular configuration facilitates dispersal of semi-solid material, e.g., in rectangular cake pans having generally square corners. Other configurations can easily be adapted for any of a variety of applications.

Desirably the cap (25) is made of a flexible, heat resistant material such as silicone rubber or other well known soft, flexible plastics. The flexible/compressible nature of the cap (25) not only facilitates use on a variety of shaped surfaces, but also allows the cap (25) to be connected to the scoop (11) by a friction fitting as shown in FIG. 2 without the need for further mechanical attachment. If desired, however, mechanical attachment can be provided, such as circumferential screw threads, snaps, clips, or any other suitable apparatus.

The scoop may be manufactured from any of a variety of well known materials including plastics which are durable, heat resistant and economical. Preferred materials should be dishwasher-safe and retain clarity under the use conditions contemplated. Similarly, the plunger may be manufactured from any suitable materials, including plastics, metal, wood, etc. Plastics are desirable for their ease of manufacture, economics, and ease of clean-up when used with semi-solid materials.

To measure semi-solid materials the scoop (11) is drawn into semi-solid material, substantially filling the tubular body (13). The scoop (11) then is withdrawn, and excess semi-solid material protruding outwardly from the ends of the tubular body (13) is removed, as by cutting with a knife or similar object. The plunger (20) may then be inserted into one end of the tubular body (13) to at least partially displace the semi-solid material. The depth of insertion of the plunger (20) may be visually determined if the tubular body (13) is transparent; gradations on either the tubular body (13) or the plunger (20) may be referenced to identify the amount of semi-solid material displaced from or remaining in the tubular body (13). Thus, displacement and measurement may occur simultaneously. When the appropriate amount of semi-solid material has been displaced from the tubular body (13), this material may be cut off with a knife or similar device.

The invention may further be used to dispense shortening or similar semi-solid material across a surface such as a cookie sheet by drawing the scoop (11) into semi-solid material to at least partially fill the tubular body (13) therewith, placing a perforated cap (25) over one end of the tubular body (13), and then inserting a plunger (20) into the tubular body (13). As the plunger (20) is pressed against the semi-solid material, the latter will extrude out through perforations (29) in the cap (25). As the semi-solid material is extruded, the face (28) of the cap (25) may be drawn across a surface to disperse the semi-solid material thereon. If a pre-determined amount of semi-solid material is to be dispersed across a surface, that amount of semi-solid material may be measured as described above and thereafter dispersed on the surface.

In accordance with the above teachings, the device of the invention allows one to measure, dispense, and disperse semi-solid materials onto other surfaces, with precision, and without the mess and awkwardness traditionally associated with these tasks. Clean up of the device is easily accomplished, particularly if the device is manufactured from dishwasher-safe materials.

While a preferred embodiment of the present invention has been described, it should be understood that various changes, adaptations and modifications may be made therein without departing from the spirit of the invention and the scope of the appended claims.

What is claimed is:

1. A method of measuring shortening and similar semi-solid materials comprising the steps of:
   drawing a measuring scoop having a tubular body which is open and unobstructed on both ends into the semi-solid material to substantially fill the tubular body;

withdrawing the scoop from the semi-solid material and cutting off excess semi-solid material protruding outwardly from both ends of the tubular body; and inserting a plunger closely receivable in the tubular body to expel a measured portion of the material from the tubular body.

2. The method of claim 1 wherein the plunger is inserted to expel substantially the entire contents of the tubular body, the expelled portion thereby being substantially equivalent to the volume of the cavity defined by the tubular body.

3. The method of claim 1 wherein the plunger is inserted into the tubular body a measured distance determinable with reference to measurement gradations on either the tubular body or the plunger to expel a measured portion equivalent to a partial volume of the interior of the tubular body.

4. The method of claim 3 including the step of cutting off the portion of semi-solid material which has been expelled from the tubular body.

5. The method of claim 4 wherein the tubular body is transparent, permitting visual determination of the position of the plunger within the tubular body.

6. A method of measuring shortening and similar semi-solid materials comprising the steps of:
  drawing a measuring scoop having a transparent tubular body which is open and unobstructed on both ends into the semi-solid material to substantially fill the tubular body;
  withdrawing the scoop from the semi-solid material and cutting off excess semi-solid material protruding outwardly from both ends of the tubular body;
  inserting a plunger into the tubular body a measured distance determinable with reference to measurement gradations on either the transparent tubular body or the plunger to expel a measured portion equivalent to a partial volume of the interior of the tubular body; and
  cutting off the portion of semi-solid material which has been expelled from the tubular body.

* * * * *